Patented July 7, 1925.

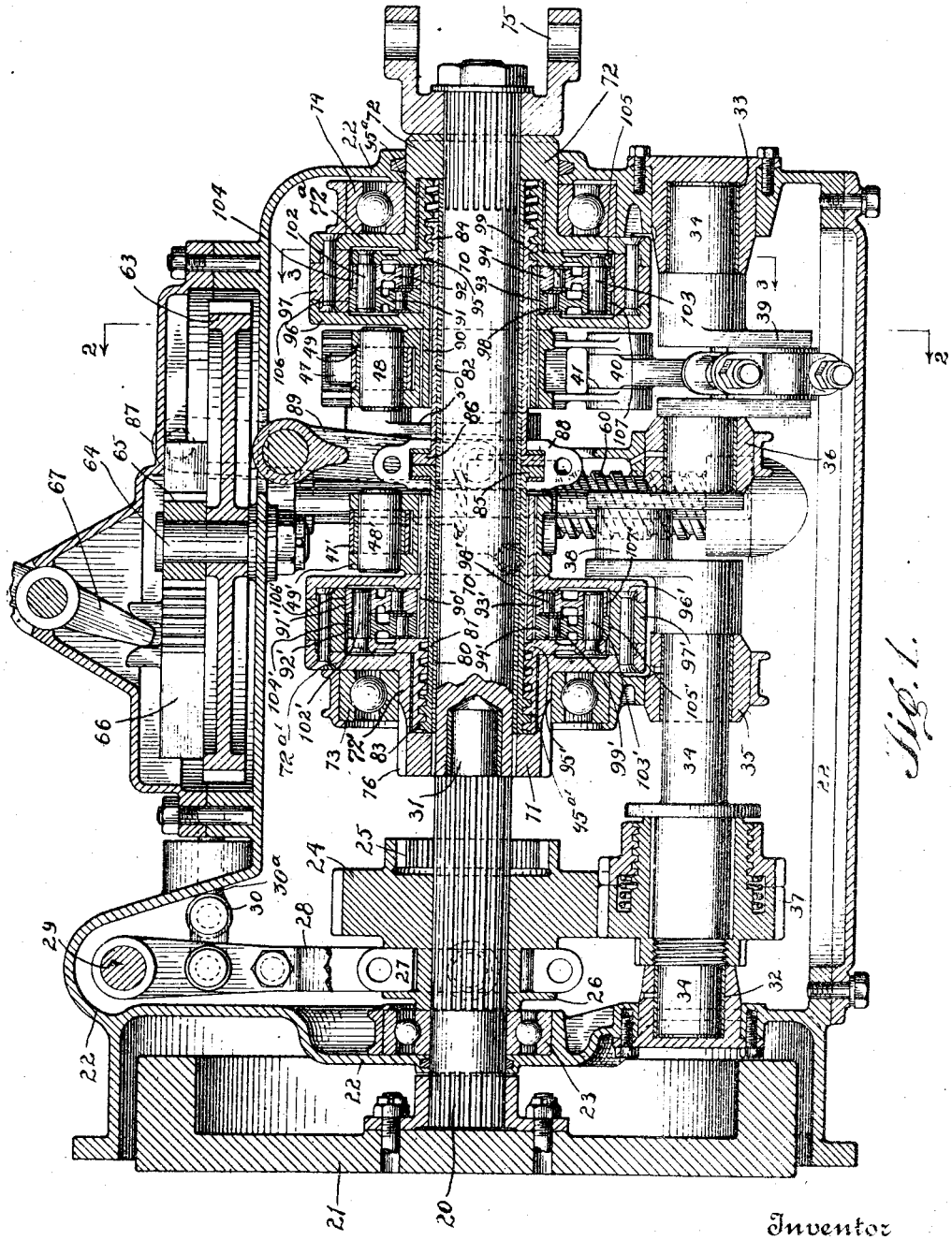

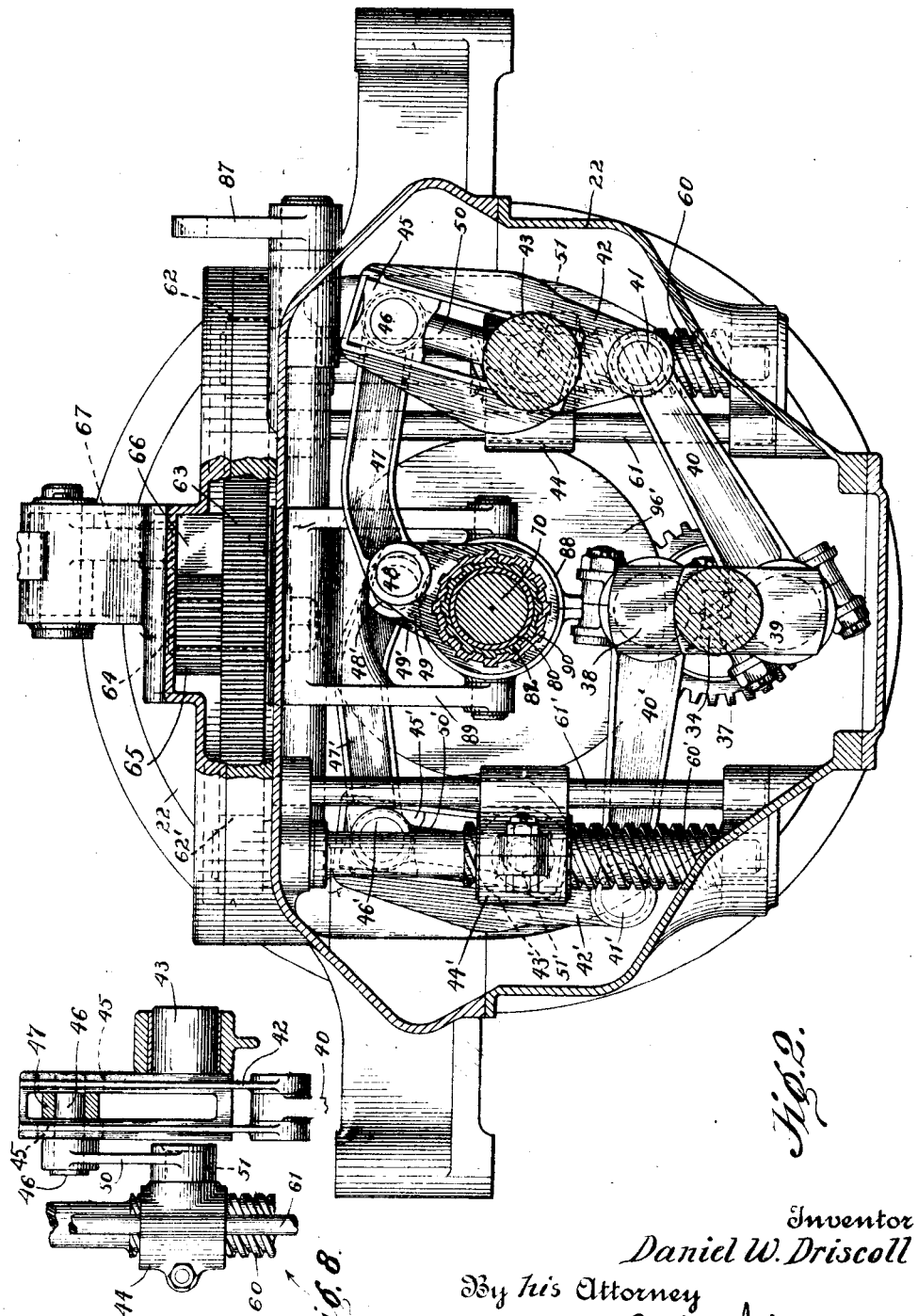

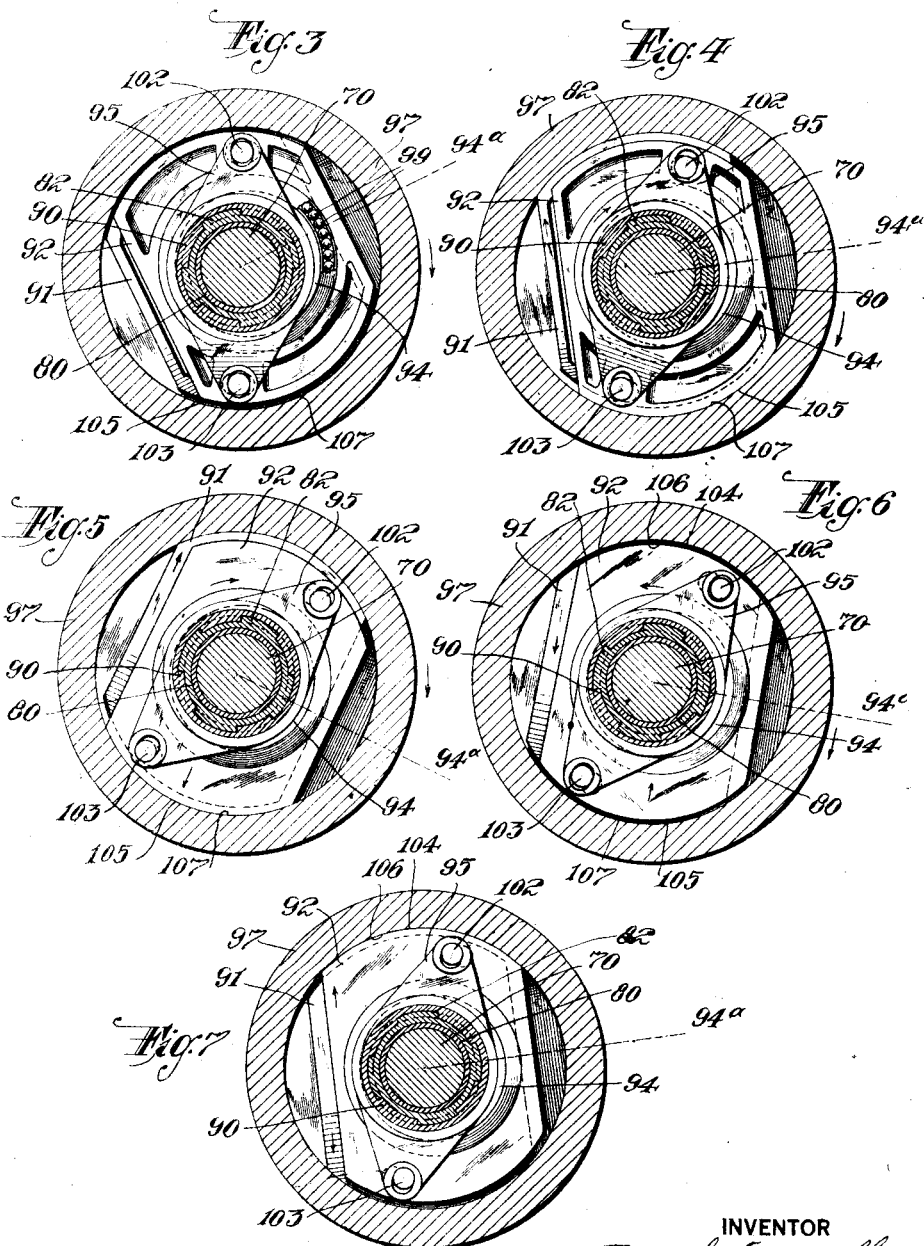

1,545,043

UNITED STATES PATENT OFFICE.

DANIEL W. DRISCOLL, OF NEW YORK, N. Y., ASSIGNOR TO DRISCOLL PATENTS COMPANY, OF WILMINGTON, DELAWARE, A CORPORATION OF DELAWARE.

VARIABLE-SPEED TRANSMISSION.

Application filed March 19, 1921. Serial No. 453,608.

*To all whom it may concern:*

Be it known that I, DANIEL W. DRISCOLL, a citizen of the United States, residing at New York, in the county of New York and State of New York, have invented certain new and useful Improvements in Variable-Speed Transmissions, of which the following is a specification.

The object of this invention has been to provide a variable speed transmission having any or all of the following advantages: that of possessing great flexibility as to the variation of the speed ratios transmitted thereby and yet of having a positive drive; that of continuously transmitting the power; that of having capacity for changing the speed ratio irrespective of the position of the driving parts; that of requiring no clutch between such mechanism and the motor or driving shaft; that of having a reverse mechanism so constructed and arranged that the speed changing mechanism is as flexible for reverse driving as for forward driving; and that of being capable of operation at high speeds.

The invention is capable of embodiment in many different forms and while it will be illustrated by the best embodiment thereof known to me, such embodiment is to be regarded as only typical of many possible embodiments, and the invention is not to be confined thereto. Speaking more particularly of the form chosen for illustration:

A power shaft or member produces an oscillatory movement of an impeller, impellers, a set of impellers, or sets of impellers, which transmit motion to a driven member during that portion of their movement which is in the direction of travel of the driven member. If a single impeller be used, there is necessarily a period when the impeller is not transmitting motion to the driven member, so it is preferred to use a plurality of impellers which act at different times upon the driven member in such a way that their power impulses are continuous with each other or overlap and motion is thereby continuously transmitted to the driven member. That is, the impellers are so synchronized that the time when the second impeller shall engage the driven member beyond yielding, shall be coincident with or precedes, the time when the first impeller disengages to the point of yielding.

Oscillatable members are provided which are in the nature of levers through which the power passes in going to the impellers and by varying the length of the work arm as compared with the power arm, the speed ratio is changed.

The impellers in the preferred form, have two oppositely effective power transmitting faces only one of which is effective at one time so that by transferring the effectiveness from one face to the other, a reversal is secured of the direction of the power transmitted by the impeller.

For convenience and simplicity, these various means and aspects of the invention have been embodied in a single mechanism but I fully realize that they are capable of many embodiments for the invention can be used in any machine where a control for variable speed is desirable. Examples of such use are the entire automotive field, all machine shop equipment as lathes, drills, slotters and the like, pumps, wind and water mills, marine propulsion, etc., it being understood that the invention is not limited to any special or particular use.

The embodiment herein described is illustrated in the accompanying drawings, in which:

Figure 1 is a longitudinal section of the device;

Fig. 2 is a vertical section taken along the line 2—2 in Fig. 1;

Fig. 3 is a vertical section taken along the line 3—3 in Fig. 1 looking toward the left and showing the interior of the impeller group and the impulse-imparting elements. In this view, however, the impeller elements are in initial position and free from the drum;

Fig. 4 is a view similar to Fig. 3 except the impeller elements have been moved longitudinally of themselves by the eccentrics so that the forward driving surfaces are in contact with the drum and have begun to move the drum in the direction indicated by the arrow;

Fig. 5 is a view similar to Fig. 4, except that the impeller elements have reached the end of their driving stroke;

Fig. 6 is a view similar to Fig. 5 except that the impeller elements have been retracted from the drum and are ready to return to the initial position shown in Fig. 3;

Fig. 7 is the same as Fig. 4 but with the impeller elements arranged for reverse driving instead of forward driving as shown in Fig. 4;

Fig. 8 shows a detail of the oscillator support and a part of the means for adjusting the sliding block in relation to the oscillator.

In that embodiment of my invention which I have chosen for the purpose of illustrating the invention in the accompanying drawings, the following elements or groups of elements occur in the following order, leading from the driving member to the driven member: the driving member or power shaft including an auxiliary shaft driven thereby, the oscillator or oscillators driven from the power shaft through the auxiliary shaft, an impeller or impellers actuated by the oscillator group, a control or control group for adjusting the effective range of movement of the oscillator or oscillators, a reversing group for controlling the impeller or impellers to make them drive forward or backward, and a driven element or group which is actuated by the impeller or impellers. These groups will now be described in the foregoing order:

*Power shaft group.*

The mechanism is, as stated, designed to transmit motion to a driven member with the capacity for varying the extent and direction of motion transmitted. In the present instance, the driving member consists of a driving shaft 20 forming a part of, or connected to the shaft or fly wheel 21 of a prime mover or other source of power, extending into the transmission housing 22 and supported by a bearing 23. Splined on this power shaft is a gear 24, having an internally geared extension 25 on one side thereof and a grooved collar 26 on the other side. This gear 24 is slidable upon the power shaft 20 by means of a stirrup or band 27 taking around the grooved collar 26 and operated by a lever 28 fulcrumed at 29 and connected by a link 30 to a bar 30ª that is adapted to be shifted by the operator. The inner end of the power shaft is reduced at 31, and journalled in the driven shaft to be later described.

Suitable journalled at 32 and 33 in the housing 22 is an auxiliary shaft 34 which has intermediate journals at 35 and 36. This shaft carries a gear 37 (which may be a composite one as shown, but the details of which need not be described) with which the power shaft gear 24 is adapted to mesh, whereby the auxiliary shaft is driven. The auxiliary shaft 34 is provided with two cranks 38 and 39.

*Oscillator group.*

In accordance with the invention, the motion of the auxiliary shaft is transmitted to an oscillator or oscillator group, which latter transmits motion to the part or parts by which the impellers are actuated, the oscillator or oscillators being so constructed that the proportion between the motion received and the motion transmitted can be varied by suitable control mechanism. In the present instance, the oscillator group comprises two similar sets of which one will be described first. From crank 39 on the auxiliary shaft, a connecting rod 40 is driven which is pivoted at its other end at 41 to the lower end of an oscillator 42. This oscillator is provided with a laterally extending gudgeon or boss 43 (projecting toward the viewer in Fig. 2) by means of which the oscillator is suitably journalled in a support extending from the housing. The upper part of the oscillator 42 is slotted and in the slot are two sliding blocks 45 to which, by a pin 46, is pivoted a curved connecting rod 47. The opposite end of the latter is connected by a pin 48 to an impeller arm 49. A link 50 having one end pivoted on the pin 46, has its other end pivoted on a pin 51 extending from a supporting frame 44. The pin 46 is supported from the frame 44, and the latter is mounted on a screw shaft 60 and a guide rod 61 to be latter described. Similarly, crank 38 is connected to an oscillator 42' by a connecting rod 40' through a pin 41', said oscillator having a boss 43' that is journalled in a fixed bearing. Blocks 45' are mounted in slideways in the oscillator and carry a pin 46' on which is pivoted a curved connecting rod 47' whose opposite end is pivoted to an impeller arm 49' by a pin 48'. The impeller arms 49 and 49' are splined on impeller operating sleeves 90 and 90' respectively, which sleeves are indirectly mounted on the driven shaft and transmit motion to the impellers as later described.

*Control group.*

In the illustrated embodiment of the invention, the control group or mechanism for varying the proportion of motion transmitted by the oscillator or oscillators to the impellers comprises a construction as follows:

The supporting frame 44 for the link 50 and pin 46, is internally threaded and adapted to encircle and engage a vertical threaded shaft 60. The frame 44 also slides on a guide rod 61. At its lower end the threaded shaft 60 is journalled in the housing 22 and at its upper end carries a gear 62 adapted to mesh with a large horizontally located gear 63 journalled on stub shaft 64. Similarly, the other oscillator has a threaded shaft 60'; guide rod 61' and gear 62' meshing with large gear 63. On stub shaft 64 is a small gear 65 meshing with a rack 66 reciprocated by a lever 67. Reciprocation of the rack rotates gears 65 and 63, the latter of which rotates gears 62 and 62'. The rotation of the gears 62 and 62' simultaneously raises or lowers the supporting frames 44 and 44'. This movement of the supporting frames, by means of links 50 and 50' raises or lowers the position of sliding blocks 45 and 45' and pivot pins 46 and 46' respectively, to move them nearer to or away from the axes of the bosses 43 and 43' which are the fulcrums of the oscillators 42 and 42'. Movement of the sliding blocks toward or away from the fulcrums of the oscillators varies the proportion of motion transmitted by the oscillators.

*Driven shaft group.*

The driven shaft member or group can be of any desired construction and may have any desired motion. In the present instance, such member has a rotary movement and one which is uniform. The illustrated construction is as follows:

The driven member is a shaft 70 having hubs 71 and 72 splined on the shaft and suitable bearings 73 and 74 for the hubs. A coupling or universal joint 75 is provided in the present instance for a further shaft to be driven. The inner end of the shaft 70 is provided with a socket in which the reduced end 31 of the driving shaft 20 has a bearing. The hub 71 has external teeth 76 which mesh with internal gear 25 on gear 24 when the latter gear is disconnected from the gears 37 on the auxiliary shaft 34 and connected direct to the driven shaft 70 so that the drive is direct from the driving to the driven shaft and the variable speed elements are idle. Having now described the parts by which the rotary movement of the driving shaft is converted into oscillating movement of the oscillators (and the parts by which the length of such oscillations is regulated according to the ratio of speed which it is desired to transmit to the driven shaft) the impeller group which receives the said oscillating movement of the oscillators and transmits it to the driven shaft will now be described.

*Impeller group.*

The other features of my invention can be used to transmit motion to the driven member through impellers of various construction. In the present embodiment of my invention, the impeller group is constructed as follows:

Encircling driven shaft 70 is a liner tube 80 and surrounding the liner are two oppositely directed sleeves 81 and 82, which respectively have threads 83 and 84 of very steep pitch. Said sleeves also have abutting flanges 85 and 86, which flanges are enclosed by a ring 88 for sliding the sleeves 81 and 82 with respect to driven shaft 70. The said ring is shifted by means of lever or arm 89 which may be connected to any suitable lever operating means 87.

As described in connection with the oscillator group, the impeller arms 49 and 49' are splined upon impeller operating sleeves 90 and 90'. These sleeves are themselves splined upon the said sleeves 81 and 82. The sleeve 90 has keyed upon it two eccentrics 93 and 94 which are positioned 180° apart. Upon each eccentric is mounted an impeller 91 and 92 respectively, series of rollers 98 and 99 being interposed between the eccentrics and their impellers.

The impellers co-operate with and drive a rotatable part. They impinge upon the preferably internal cylindrical surface of a drum which in the present instance is carried by the hub 72, said drum having an annular body 97 carried by a flange 72ª on the hub 72, the open end of the drum being closed by a cap plate 96. The impellers engage the internal cylindrical surface of the drum by a working face which is a counterpart of a portion of said surface, the said working face preferably being of the same radius as the said cylindrical surface. In the present instance, for the purpose of transmitting motion in either direction, there are two opposite working faces 104 and 105 respectively on the impeller 92 and 106 and 107 respectively on impeller 91. The length of the impeller, from working face to working face, is made slightly less than the diameter of the drum.

When an eccentric is oscillated by its impeller arm, it first presses one of the working faces of the impeller outwardly against the internal surface of the drum until the said surfaces are gripped together, and then continued movement of the eccentric carries the impeller and drum with it in rotary motion.

At the start of said operation by the eccentric it is desirable to prevent the impeller from rotating with the eccentric, in order that the impeller may be thrust outwardly to grip the drum. When the eccentric has begun its return movement and has relieved its pressure on the impeller face, it is desirable to stop the impeller from travelling with the drum and to return it to its initial position. Such control of the impeller is effected by the following means: A plate 95 is mounted on the sleeve 82 and carries pins 102, 103 which project into slots formed respectively in the impellers 91 and 92. The pin or pins 102 have a fixed relation to the eccentric when the driven shaft is being driven forward but have another fixed relation thereto when said shaft is being driven backward. In order to cause said pins 102 to occupy either of said positions and to shift from one to the other and especially while the machine is running, the following means are provided: The plate 95 is mounted on the sleeve 82 by having a hub embracing or enclosing said sleeve, said hub and sleeve having respectively, internal and external threads of coarse pitch. The hub of the sleeve 82 is prevented from movement longitudinally of the driven shaft by being enclosed in the drum with the impellers. Consequently, when the sleeve 82 is shifted along the shaft by operation of the lever 87, the external threads on the said sleeve, slide through the internal threads on the hub 95ᵃ of the plate 95 and cause the said hub and plate to turn relative to said sleeve and the eccentrics to throw the pins 102 into the other operative position. In the illustrated embodiment of the invention the two positions of the pins 102 are but 15° apart. The angle may be more or less dependent on the amount of clearance between the impeller and the drum.

The parts are so related that, when the drum is to be driven forward, the impeller face which is to be used for that purpose, (for instance, the face 105) will, under the influence of pins 102, be on the forward side of the highest point 94ᵃ of its eccentric when such face is retracted. The result is that when the eccentric starts on its forward oscillation it will first build up under the impeller and force the working face 105 outward against the drum and will then carry the impeller and drum forward until the eccentric begins to slow down ready to begin its reverse oscillation. The impeller will tend to go forward with the drum, which will cause it to slide down-hill on the eccentric, so to speak, until the impeller strikes the pin 102, when being released from the drum, it will be returned to its initial position by the said pin.

The impellers 91 and 92 are kept in phase by the pins 102, which extend through both of them. When the upper working face 106 of impeller 91 is operative, the lower working face 105 of impeller 92, is operative, but because their respective eccentrics are 180° apart, the said working faces both drive the drum forward. Similarly, on the reverse stroke, when the lower face 107 of impeller 91 is operative, the upper face 104 of impeller 92 is operative. When the drum is to be driven backward, the hub 95ᵃ and plate 95 are shifted relative to the eccentric so that the pins 102 position the impeller with its opposite working face 104 on the rear side of the highest point 94ᵃ of its eccentric. Consequently, when the eccentric starts on its backward oscillation, it first builds up under the working face 104 until it has forced the said face against the drum, after which, since the eccentric can force the impeller no farther outward, it carries the impeller and drum with it, impelling the drum backward. As the eccentric slows down to reverse its movement, it releases the impeller and the pins 102 stop and reverse the impeller, carrying it back to initial position. When the mechanism is operating in reverse, impeller 92 is, as described in connection with the operation for driving forward always in phase with impeller 91, but its operative working face is always the opposite one to that one which is operative on impeller 91. The same result could obviously be obtained by using one working face on the impeller for driving in both directions, by shifting it to positions on the forward or rear sides of the highest point, 94ᵃ on the eccentric, respectively according to whether a forward or a backward motion is desired, but a very much smaller angle of shifting will serve where the two working faces are used than would be required if a single working face were used.

A very important feature of the impeller mechanism is the placing of a series of anti-friction rolls or balls 98 or 99 between the eccentric and the impeller or by the use of some other expedient, reducing the friction between the impeller and the eccentric to a point where it will be lower than that between the impeller and the drum. This substantially avoids causing the impeller to slide on and grind against the drum, as would otherwise occur when the impeller is under some pressure against the drum but is travelling slower than the drum as must occur both at the beginning and close of the period of contact between them, while the impeller is increasing its speed after the period of reversal and before it has reached its maximum speed at which it is substantially in synchronism with the drum and vice versa.

The other impeller set is of the same construction as that just described, except reversed, so the reference numerals of the similar and corresponding elements will simply be primed.

*Operation.*

The operation of each group of elements has been described in connection with the description of the structure thereof. The operation, as a whole, of that embodiment of my invention which is illustrated in the drawings in the present case is as follows:

Assuming the parts to be set for forward motion, i. e., with the sleeves 81 and 82 in the extreme left-hand position as shown in Fig. 1, so that the high points on the eccentrics in the extreme rearward positions thereof are to the rear of the faces on their respective impellers which will be ahead of those high points on their forward strokes:

Rotation of the driving shaft 20 with the gear 24 meshing with gear 37 rotates auxiliary shaft 34, whose cranks 38 and 39 operate connecting rods 40 and 40' whereby oscillators 42 and 42' are oscillated about their pivots 43 and 43' respectively, which oscillation shifts the curved connecting rods 47 and 47', and impeller arms 49 and 49' with the impeller sleeves 90 and 90' to which they are attached.

Movement of the sleeve 90, during rocking, carries with it the eccentrics 93 and 94 which first shift the impellers 91 and 92 longitudinally of themselves until they firmly engage with the inside periphery of the drum 97 as shown in Fig. 4 when continued movement of the eccentrics through the medium of the rollers 99 causes the impellers and drum to move in the direction of the arrow in and to the position shown in Fig. 5. The return oscillation of the eccentrics then first retracts the impeller by a movement longitudinally of itself and away from the said periphery, to the position shown in Fig. 6, and finally the pins 102 carry the impeller back to the initial position shown in Fig. 3. Thus, the impellers contact with the drum and impel it forward during their own forward movement but on their return stroke are free from the drum.

So that the movement of the drum may be uniform, during the time one set of impellers 91 and 92 is returning from a working stroke the second set 91' and 92' is in active engagement with the drum 97' and a substantially continuous power impulse is thereby given.

Rotation of the drums 97 and 97' causes rotation of the driven shaft 70, as the drums are secured thereto and their hubs 72 and 72' respectively by means of the flanges 72ᵃ and 72ᵃ'.

The operation so far described has been for forward motion and the relation of the parts as shown is for such motion. However, the action of the impellers can be reversed so that while the driving shaft continues in a "forward" direction, the motion of the driven shaft will be changed or reversed.

This reversing may be brought about by moving the lever 87 on its pivot whereby ring 88 is moved to the right in Fig. 1 which similarly moves the abutting flanges 85 and 86 and the sleeves 81 and 82 to which they are attached. This action shifts the male threads 83 and 84 on the sleeves 81 and 82 respectively through their respective female threads 95ᵃ and 95ᵃ' in the hubs 71 and 72 and rotates the hubs and with them the eccentrics relative to said sleeves through the medium of the plates 95 and 95' and the pins 102 and 102' carried thereby. Rotation of the sleeves causes progression of the said male threads, longitudinally of the driven shaft until they cannot go further, whereupon further rotation of the sleeves and threads causes rotation of the hubs and plates 95 and 95', which movement of the plates is continued until the pins 102 and 102' carried by the plates move the impellers from the position shown in Fig. 4 to that shown in Fig. 7, that is, through such an angle with respect of the eccentrics, that the high points on the eccentrics in the extreme forward positions thereof are forward of the faces on their respective impellers which will be ahead of those high points on their rearward strokes, thus impelling the inner periphery of the drum in a rearward direction, and reversing the direction of the driven shaft. This reversal of engaging face naturally reverses the direction of the rotation of the drum. In reversing the mechanism, the eccentrics are never shifted relative to their impeller arms 48 and 48'.

To move the parts from reverse to forward position, the lever 87 needs only to be returned to initial position with the resultant return of the sleeves 81 and 82, and the threads 83 and 84, and plates 95 and 95' and impellers, as shown in Figs. 1 to 6 inclusive.

To vary the ratio between the speed of the driving and driven shafts, the pins 46 and 46' are shifted toward or from the pivots or fulcrums 43 and 43' of the oscillators 42 and 42' respectively, by means of the frames 44 and 44' through the links 50 and 50', said frames being shifted by means of the lever 67 and intermediate toothed gearing and screws, as before described. This varies the distance of the pins 46 and 46' from the fulcrums 43 and 43' of the oscillators 42 and 42' as compared with the distance of the pins 41 and 41' therefrom. In other words, the relative lengths of the two arms of the oscillators 42 and 42' are varied, thus varying the throw and consequently the speed given the impeller arms 49 and 49' by the connecting rods 47 and 47', and the throw and speed of their respective impellers. More particularly, since the oscillators move on fixed fulcrums 43 and 43' respectively and likewise the pins 41 and 41' are at a fixed distance from the oscillator fulcrums, the changing of the distance of the pins 46 and 46' from the oscillator fulcrums changes the speed relation of the connecting rod 40, for instance, with that of the curved connecting rod 47 and this change effects all the parts following the connecting rod, such as the impeller arms 49, sleeves 90, impellers, drums and driven shaft. Therefore, a comparison of the distance between the pin 41 and the oscillator fulcrum with that between the oscillator fulcrum and the pin 46 gives the speed ratio between the driving and driven shafts.

As the pins 46 and 46' can be brought into any position from axial alignment with the oscillator fulcrums 43 and 43' to the positions shown in Fig. 1 at a greater distance from the fulcrums than that of the pins 41 and 41', the angular velocity and speed of the impeller arms 49 and 49' can be varied from zero nearly to 180°

It can thus be seen that any speed ratio through a wide range can be obtained and obtained independently of the position or phase of movement of any of the other parts of the mechanism and without the use of any clutch and while the mechanism is continuously transmitting power. If, however, a direct drive is desired, when speed at unity ratio is being transmitted, bar 30* of the lever 28 is operated to throw gear 24 out of mesh with gear 37 whereupon the whole transmission system idles and then the gear 24 is slid along until internal gear 25 meshes with gear 76, whereupon the drive is direct from driving to driven shafts.

The embodiment of the invention above described possesses, among other advantages, the following:

The said mechanism is capable of transmitting motion, either forward, or backward, the change in direction of motion transmitted can be effected without the use of any clutch. Such change can also be effected while the mechanism is in motion. The said mechanism will transmit motion forward or backward equally well, whether the driving shaft be driven forward or backward.

The reversing mechanism is of extreme simplicity. The said mechanism is so constructed that the same parts are used for driving in either direction, thus saving the complexity which is usually present in such mechanisms, due to the use of one set of parts for driving in one direction and another set of parts for driving in the opposite direction.

The dimensions of the mechanism of said embodiment transversely to the axes of the shafts are relatively small, so that the mechanism can be used in cramped positions, such as on an automobile.

The said mechanism is well balanced and practically free from vibration at ordinary speeds, and can be driven at a relatively high speed without producing more vibration than is permissible for many uses. The said mechanism is so designed that the efficiency thereof in transmitting power is comparatively high.

The speed of the driven shaft can be made any desired speed between zero and unity with the driving shaft in either direction.

In the said mechanism, the fulcrums of the oscillating parts for controlling the ratio of the speed transmitted to that received are rigidly mounted on the frame, which is a construction that will wear better and be freer from vibration than one in which those fulcrums are moved in changing the speed ratio.

In the said mechanism, neither the bearings nor any shaft near the fulcrums nor any levers are shifted in changing the ratio of motion transmitted, but only one end of one connecting rod.

The said mechanism is so constructed that the wear of the parts need not be more than the ordinary wear of any well designed machine, and will probably be much less than the wear in the speed-changing devices in use in automobiles at the present time.

In the said mechanism no spur gears are necessary in the transmitting mechanism itself, except for transmitting motion from the driving shaft to the auxiliary shaft.

In the said mechanism the driving shaft and driven shaft being in alignment with each other, the variable speed mechanism can be put into a line of shafting already established without changing the alignment thereof.

In the said mechanism there are a plurality of systems of impellers and their connections or linkages for varying the speed transmitted to the impellers and the said duplicate mechanisms are arranged upon opposite sides of the axes of the driving and driven shafts in such a manner that each mechanism balances and nullifies the vibration of the other to a considerable extent.

In the linkages or trains of elements for transmitting controllable motion to the impellers in the said mechanism, the greater proportion of the parts are under direct tension or compression and hence can be made lighter than those subjected to cantilever action which latter necessarily have to be heavier than the said first-mentioned parts, there being only one cantilever element (the oscillator) in each linkage.

Also in the linkages the connecting rods, respectively, transmitting motion to and from the oscillating member, in connection with which a variation in speed is obtained, are substantially in the same plane, thus balancing the thrusts of said rods.

While the impellers drive their drums forward, they do not prevent the drum from going or being forced forward faster than the impellers are going. The impeller mechanism therefore, in addition to performing its function as part of a variable speed transmission, can also perform the function of a clutch of the coaster part of the device known as a coaster brake which is used in bicycles. Because of such capacity of the said mechanism, the said mechanism can serve, not only as a variable speed transmission, but can enable clutches to be dispensed with in various mechanisms.

This variable speed transmission changes both speed and torque continuously from zero to motor speed or direct drive while the torque can be multiplied until slipping of the driving wheels takes place. This is accomplished without disengaging any of the driving members, therefore, there is no interruption of either torque or speed and it is not necessary to employ a clutch, nor is there any shock or jar as in a gear transmission with the resultant wear and breakage.

Since the power flow is not interrupted, there is no loss of momentum and the same motor is capable of higher gradients with greater loads and increased speed. In other words, the overall efficiency is higher. This makes it possible to use a smaller motor for the same work.

Since a smaller motor can be used, the ratio of power used to power available or the power factor is higher and greater fuel economy per ton-mile results.

Another advantage of the use of this invention in an automobile is in getting under way up grade or more especially in mud holes, or sand. With the present gear transmission, the reduction in low gear is fixed and the motor speed regulated by the throttle position so that when very slow speeds are required as in starting, there is great danger of stalling the motor. Even then the rear wheels are likely to start so quickly that their grip is lost and slipping occurs. However, with the present invention, the engine can be run at fair speed and the reduction ratio to the wheel can be started at zero and gradually increased as traction is obtained. That is, any speed, no matter how slow can be used and since the torque can be increased up to the limit of the driving wheel traction while the motor need not be raced as at present.

In point of size, the transmission of this invention is the same for the same horsepower as the transmissions in use at present. Standardization was not lost sight of and the machining operations of the making of one of these devices are such as are used every day in the production of internal combustion motors and similar machines. In general, the operations are simpler than those required to generate high class gearing and cost less per machine, besides requiring less for initial outlay in jigs, tools and special machinery. The weight is about the same as for a gear transmission.

This transmission is available for either shaft or chain driven vehicles and it can be mounted on the rear axle of an automobile or tractor, where, due to the action of its impeller mechanism, another very desirable feature of the transmission would be available, namely, the prevention of "spinning of the fast wheel" as it is frequently called. That is, in this location and use, the impeller drum and impellers would replace the conventional gear differential and it is characteristic of the impeller action that it has a positive torque on the slow wheel at all times.

At present motor vehicles are overpowered and operated most of the time with the charge strangled by the throttle. This lessens the working compression and reduces the efficiency of the motor which results in increased fuel consumption, whereas, the engine can be run at its efficient speed and flexibility of drive obtained by the easy and infinite variation of speed offered by the transmission of this invention.

What I claim is:

1. In a transmission, the combination of an element to be driven, a pivoted impeller adapted to rotate said element, an eccentric on which said impeller is mounted, means for oscillating said eccentric, said impeller having a driving face on each side of its pivot, and means for rendering either face effective to control the direction of rotation of the element to be driven.

2. In a transmission, the combination of an element to be driven, a plurality of impellers adapted to rotate said element and rotatable means for controlling the direction of drive of the element by the impellers, said means including a longitudinally movable rotatable sleeve.

3. The device of claim 2 in which said longitudinally movable rotatable sleeve is toothed.

4. In combination in a transmission, a driving shaft and a driven shaft in line with each other, two levers on opposite sides of one of said shafts movable always in opposite directions to counterbalance each other, linkages to operate the levers from the driving shaft, and further linkages to operate the driven shaft from the levers.

5. In a transmission, a driven element provided with a cylindrical working surface, a double-ended impeller having a working surface complemental to the working surface of the driven element, an eccentric on which the impeller is mounted, each working surface of the impeller being extended laterally on both sides of the eccentric, and means for shifting the eccentric with respect to the impeller so that either one or the other of the working surfaces of the impeller shall be ahead of the high point of the eccentric according as it is desired to drive forward or backward.

6. In a transmission, an eccentric, a double ended impeller thereon, means for oscillating said eccentric and an oscillatable element associated with the impeller for rendering either end effective, one for driving forward and the other backward.

7. In a transmission, a set of eccentrics, means for oscillating said eccentrics, a double ended impeller on each eccentric, and an oscillatable element associated with the impellers for rendering either end effective one for driving forward and the other backward.

8. In combination in a transmission, a driving and a driven shaft in alignment, an impelling device for the driven shaft, linkages between the driving shaft and the impelling device including oscillating levers on opposite sides of the axis of said shafts, and connecting rods connected to said levers which are nearly in the same plane to balance the thrusts.

9. The apparatus of claim 8 in which a connecting rod is connected to each end of each lever and the rods connected to one lever are in the same plane to give a balanced thrust.

10. In a transmission, in combination a rotary element to be driven, an oscillating eccentric, a double ended impeller pivotally mounted on the eccentric whereby oscillation of the eccentric causes one end of the impeller to intermittently impel the rotary element in one direction, and means for adjusting the impeller about the axis with respect to the eccentric to cause the other end of the impeller to intermittently impel the rotary element in the reverse direction.

11. In a transmission, in combination a rotary element to be driven, an oscillating eccentric, an impeller having surface elements, some of which can be used to transmit motion in one direction and others of which, in the opposite direction, pivotally mounted on the eccentric whereby oscillation of the eccentric causes one end of the impeller to intermittently impel the rotary element in one direction, and means for adjusting the impeller about the axis with respect to the eccentric to cause the other end of the impeller to intermittently impel the rotary element in the reverse direction.

12. The apparatus of claim 10 in which the means include a rotatable hub associated with the impeller.

13. The apparatus of claim 10 in which the means include a rotatable hub associated with the impeller, a slidable sleeve, and threaded means between the sleeve and hub whereby sliding movement of the sleeve pivotally moves the hub to adjust the impeller.

14. In a transmission, the combination of a power shaft, variable ratio oscillatable members, means for driving the members from the power shaft, a reversible impeller device deriving power from the said members, a member adapted to be driven by said impeller device, said driven member having a surface of revolution, and said impeller device having a working face which is substantially complemental to said surface, and means for reversing said impeller device.

15. In combination in a transmission, a driving shaft, a driven member having a surface of revolution, a double ended impeller adapted to drive the driven member and having working faces that are complemental to said surface, means operated by said driving shaft for oscillating said impeller, and means for so controlling the relation of said impeller to said oscillating means that one of said working faces may be caused to drive said member forward, and the other of said faces to drive it backward.

16. In combination in a transmission, a driving shaft, a driven member having a surface of revolution, a double ended impeller adapted to drive the driven member and having working faces that are complemental to said surface, means operated by said driving shaft for oscillating said impeller, including an eccentric upon which said impeller is mounted, and means for so controlling the relation of said impeller to said oscillating means that one of said working faces may be caused to drive said member forward, and the other of said faces to drive it backward.

17. In combination in a variable speed transmission, an element to be driven having a surface of revolution and a plurality of double ended impellers for driving said element, each end of which has a working face that is complemental to said surface, one end of each impeller being used to impel the driven element forwardly, and the other end for impelling said element backwardly, the impellers being of such length that the non-working face cannot engage said element and means for oscillating said impellers.

18. A variable speed power transmission having, in combination, a drive shaft, a driven element, a pair of oppositely disposed oscillators, pivotal supports for the oscillators, two 180° cranks connected with and actuated by the driving shaft for actuating the oscillators, two impeller groups for actuating the driven element, links connecting the impellers with the oscillators, the construction being such that the two cranks, the two oscillators and the two impeller groups are moved in opposite directions at the same time respectively, so as thereby to balance the moving parts and reduce vibration.

19. A variable speed transmission having, in combination, a driving shaft and a driven shaft located in the same plane, two 180° cranks connected with and actuated by the driving shaft, two oscillators having axes on opposite sides of a plane including the driving and driven shafts, links connecting the cranks with the oscillators, links connecting the driven shaft with the oscillators, the construction being such that the movements of the two oscillators tend to counterbalance each other, the movements of the two links connecting the driving shaft to the oscillators tend to counter-balance each other, and the movements of the two links from the oscillators to the driven shaft tend to counter-balance each other.

20. A variable speed transmission having, in combination, a driving shaft and a driven shaft located in the same plane, two oscillator levers located on opposite sides of said shafts and substantially in a plane at right angles to said shafts, links to operate the oscillators from the driving shaft, and links to operate the driven shaft from the oscillators, the links between the driving shaft and the oscillators being arranged to counter-balance each other, and the links between the oscillators and the driven shaft being arranged to counter-balance each other, and means for varying the effective throw of one of the link connections between the oscillators and the driven shaft.

21. A variable speed power transmission having, in combination, a driving shaft, a driven shaft, a driven element provided with a cylindrical working surface connected with the driven shaft, intermittent clutching devices for connecting the driving shaft intermittently with the working surface of the driven element including a sleeve mounted to move axially of the driven element having provision for reversing the driving connection between the clutching devices and the driven element so as thereby to drive the driven element from the driving element in forward or backward direction.

22. A variable speed power transmission having, in combination, a driving shaft, a driven shaft, a driven element connected with the driven shaft, intermittent clutching devices and suitable connections including an auxiliary shaft for driving the driven element from the driving shaft having provision for varying the speed ratio between the driving and driven shafts, and means for directly connecting the driving shaft with the driven shaft having provision for disconnecting the drive to the auxiliary shaft when the direct drive is established.

23. A variable speed power transmission having, in combination, a housing, a driving shaft entering one end of the housing, a driven shaft entering the other end of the housing, an auxiliary shaft provided with two 180° cranks, driving connections between such auxiliary shaft and the driving shaft, a pair of oscillating intermittent grip devices for intermittent, alternate connection with the driven shaft, a pair of oscillators mounted on fixed pivots parallel to each other and to the axes of the driving and driven shafts and symmetrically located with respect to both, each oscillator being provided with a fixed wrist pin and a movable wrist pin, connecting rods connecting the cranks of the auxiliary shaft with the fixed wrist pins of the oscillators, connecting rods connecting the crank pins of the intermittent grip devices with the movable wrist pins of the oscillators, and means for varying the effective throw of the movable wrist pins of the oscillators simultaneously and equally.

24. A variable speed power transmission having, in combination, a driving shaft, an auxiliary shaft provided with two 180° cranks, gearing connections between the driving shaft and the auxiliary shaft, a pair of oscillators having fixed pivots intermediate their ends, a pair of connecting rods connecting the cranks of the auxiliary shaft with a wrist pin connection in each oscillator for actuating the latter, such wrist pin connections being fixed in the oscillators, a driven shaft, oscillating intermittent clutch devices for driving the driven shaft, each provided with a crank, a pair of connecting rods each having one end connected with a crank of one of the clutch devices, and each having its other end connected with a variable throw wrist pin actuated by the oscillator, and means for varying the effective throw of such wrist pin connection.

In testimony whereof I affix my signature.

DANIEL W. DRISCOLL.